United States Patent [19]

Brunier-Coulin

[11] Patent Number: 4,567,416
[45] Date of Patent: Jan. 28, 1986

[54] DEVICE FOR CONTROLLING AN ELECTRIC MOTOR

[75] Inventor: Charles Brunier-Coulin, Sallanches, France

[73] Assignee: Somfy, France

[21] Appl. No.: 485,230

[22] Filed: Apr. 15, 1983

[30] Foreign Application Priority Data

Apr. 23, 1982 [FR] France ............................ 82 07020

[51] Int. Cl.⁴ .............................................. G05B 19/29
[52] U.S. Cl. ..................................... 318/602; 318/592; 318/594
[58] Field of Search ............... 318/602, 594, 593, 592, 318/632, 561; 307/66

[56] References Cited

U.S. PATENT DOCUMENTS

| 3,198,937 | 8/1965 | Wooster | 318/602 X |
| 3,611,101 | 10/1971 | Kiffmeyer | 318/594 |
| 3,686,547 | 8/1972 | Kelling | 318/594 |
| 3,795,851 | 3/1974 | Gage | 318/602 |
| 4,131,835 | 12/1978 | Lange | 318/602 X |
| 4,268,783 | 5/1981 | Murray | 318/632 X |
| 4,377,744 | 3/1983 | Mocenter | 318/602 X |
| 4,379,335 | 4/1983 | Kirsch | 318/568 X |
| 4,381,458 | 4/1983 | Anstey | 307/66 |

Primary Examiner—William M. Shoop, Jr.
Assistant Examiner—Patrick C. Keane
Attorney, Agent, or Firm—Darby & Darby

[57] ABSTRACT

The device can control an electric motor intended to rotate the drive shaft of a movable member, solar protection member, closure member or the like.

The control device comprises a pulse generator device and an angular position coder, governed as regards rotation by the drive shaft, provided for supplying a signal permanently to a logic processing unit connected, through the intermediary of an input-output interface, to the terminals of the pulse generator device and of the coder and, through the intermediary of an output interface, to the electric motor. The means for regulating the stopping positions are constituted by switches connected, through the intermediary of an input interface, to the logic processing unit, in order to memorize the desired angular stopping positions in the working memory of the latter. A non-volatile memory is connected to the logic processing unit for safeguarding these angular positions in the case of a cut in the power supply. The logic processing unit is provided on the one hand for permanently analyzing the signal supplied by the generator device and by the coder, calculating the angular position of the drive shaft and comparing it with the desired angular stopping positions, and on the other hand for interrupting the rotation of the motor as soon as the calculated position and the desired stopping position are identical.

2 Claims, 6 Drawing Figures

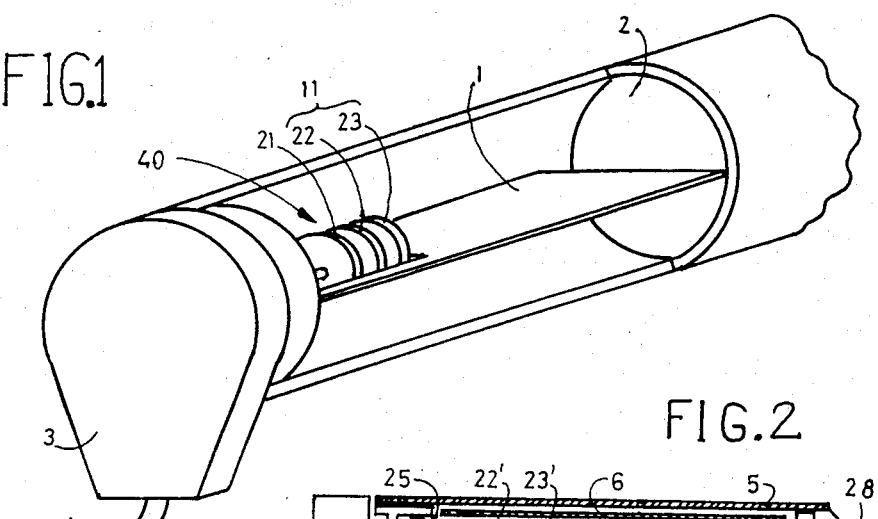
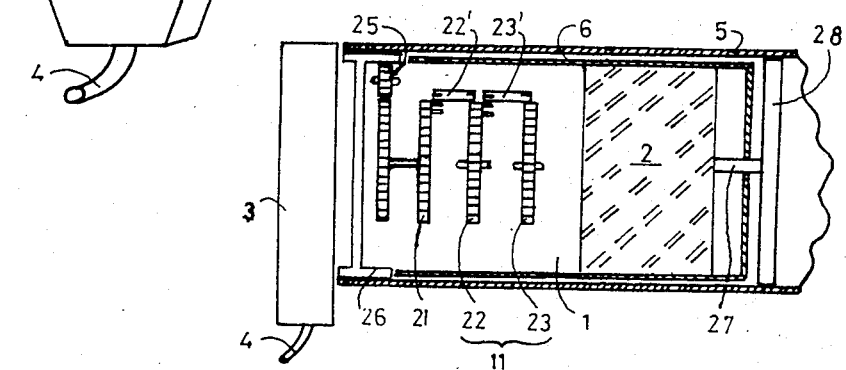
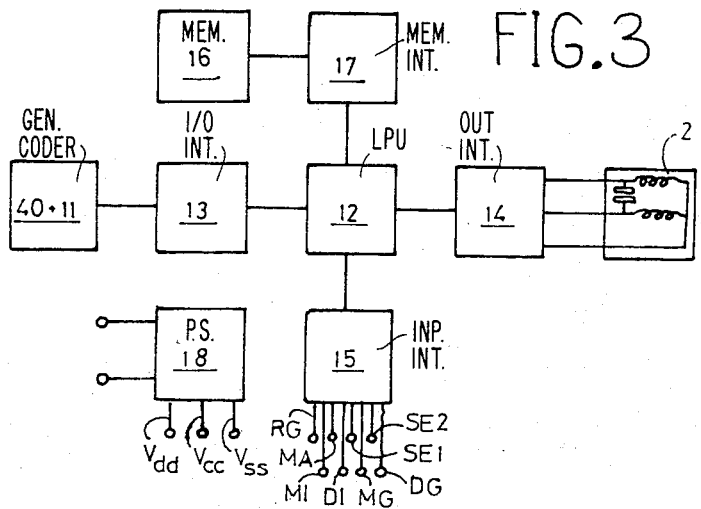

DEVICE FOR CONTROLLING AN ELECTRIC MOTOR

The present invention relates to devices for controlling an electric motor intended to rotate the drive shaft of a movable member, solar protection member, closure member or the like such as an advertising panel, cinema screen . . . These devices comprise on the one hand a stopping device, intended to interrupt the rotation of the motor automatically after a certain angular displacement of the drive shaft, carried out in either of two directions of rotation, on the other hand means for regulating the desired angular stopping positions and means for controlling the rotation of the motor constituted by switching means.

In a known control device of this type, such as that described in French Patent No. 2 455 695, the stopping device intended to interrupt the rotation of the motor after a certain angular displacement of the drive shaft is a mechanical device housed in the body of the motor, which is tubular. This device is provided in order to actuate a switch for cutting off the supply of power to the motor, solely when the movable member, roller-blind or rolling shutter etc., occupies either of its two extreme positions, either completely closed or completely open. Although a control device of this type comprises a device for regulating these two positions, which is much easier to actuate than those existing previously, it is nevertheless necessary to actuate manually two regulating members which are located at one end of the motor itself, which is not always an easy operation when the motor and the drive shaft which it must operate are fixed for example to the front of a building. Moreover, because the stopping device is mechanical, the presence of numerous components produced most frequently from moulded thermoplastics material, as well as the presence of the clearances necessary for the operation of such a device, to a certain extent impair the stopping accuracy of the motor.

The control device according to the invention is characterised in that its stopping device comprises a pulse generator device governed as regards rotation, for example by a kinematic connection, by the drive shaft and provided to supply a signal permanently to a processing logic unit connected, through the intermediary of an input-output interface, to the terminals of said pulse generator device and, through the intermediary of an output interface, to the electric motor. The means for regulating the angular stopping positions of the drive shaft are constituted by switching means connected, through the intermediary of an input interface, to the logic processing unit, in order to memorize the desired angular stopping positions in the working memory of the latter. A non-volatile memory which can be erased and programmed electrically or a battery are connected to the logic processing unit, in order to safeguard the angular stopping positions, in case the electrical power supply is cut. The logic processing unit is provided on the one hand in order to analyze permanently the signal supplied by the pulse generator device, to calculate the angular position of the drive shaft and to compare it with the desired angular stopping position or positions, on the other hand in order to interrupt the rotation of the motor as soon as the calculated position and the desired angular stopping position are identical.

According to one construction, the stopping device comprises an angular position coder associated with the pulse generator device. It comprises several discs arranged coaxially side by side. All the discs, except the first, are provided to be driven step by step by a fraction of a revolution for each revolution of the preceding disc and constitute the angular position coder, intended to indicate permanently the angular position of the drive shaft, with a precision equal to one revolution or a certain fraction of a revolution. The first disc, constantly connected kinematically to the drive shaft, forms part of the pulse generator device intended to supply the logic processing unit with information enabling the latter to calculate the angular position of the drive shaft, within the revolution or the fraction of a revolution indicated by the angular position coder.

According to another construction, the stopping device comprises solely a pulse generator device, without an angular position coder.

The present invention makes it possible to produce a device for controlling an electric motor, which, whilst being very compact and able to be accommodated inside the casing of said motor, may on demand control the stopping of this motor in positions of the movable member other than the two end positions and which may have all its stopping positions remotely controlled without manual intervention on the motor itself, these stopping positions then being inviolable even in the case where the electrical power supply is cut and even in the case of manual actuation of an auxiliary control device during said power cut. The control device also improves the performances of the stopping device, namely capacity as regards number of revolutions of the drive shaft, accuracy of the stopping positions, reproducibility of these stopping positions. In addition, complementary functions may easily be integrated in such a stopping device, which functions make it possible to control the electric motor, at will, either alone, or with others, without the additional control means increasing the bulk of the control device.

The accompanying drawings illustrate, by way of example, one embodiment according to the present invention.

FIG. 1 shows diagrammatically in perspective view, the control device housed in a tubular speedreducer unit.

FIG. 2 shows the same control device diagrammatically, in longitudinal section.

FIG. 3 shows the same embodiment diagrammatically.

Figure 4:
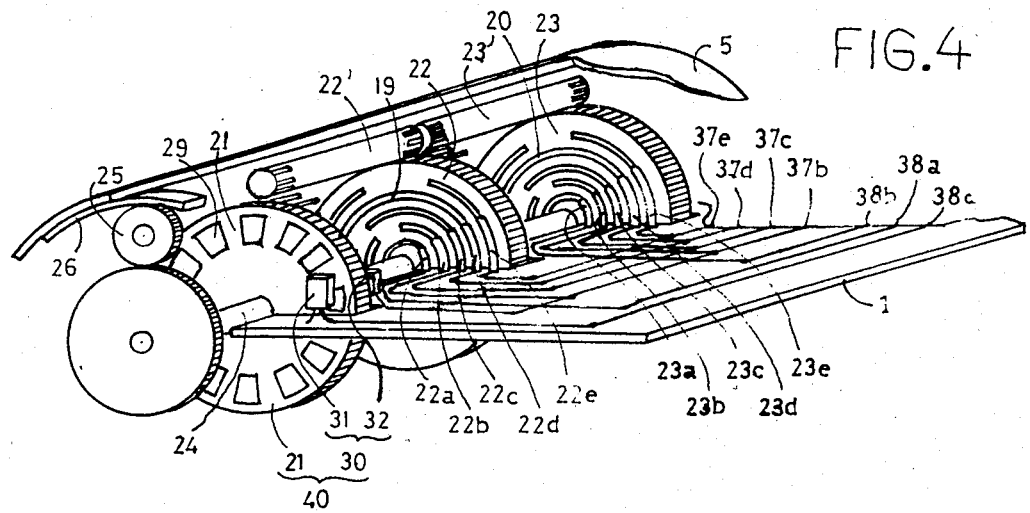
FIG. 4 shows the same embodiment diagrammatically, in perspective view.

As illustrated in FIGS. 1 to 4, the control device for the electric motor is supported by a printed circuit 1 which is housed inside the electric motor which is intended to rotate the drive shaft of a movable member. In this example, the electric motor is of the tubular type and the control device is located in the casing tube between the motor proper 2 and the end part 3 of the motor, intended to be fixed to the masonry. Emerging from this part 3 is the multi-wire cable 4 for supplying power and controlling the speed-reducer unit.

The control device comprises a stopping device intended to interrupt the rotation of the motor after a certain angular displacement of the drive shaft, carried out in either of the two directions of rotation. This stopping device comprises an angular position coder 11 associated with a pulse generator device 40 connected kinematically to rotate constantly with the drive shaft of the movable member constituted in this example by a tube 5 mounted to rotate about the casing tube 6 of the motor 2. The coder 11 and the pulse generator 40 are provided to supply permanently signals coded digitally, which are characteristic of the angular position of the drive shaft 5, to a logic processing unit 12 connected, through the intermediary of an input-output interface 13, to the terminals of said coder 11 and of the pulse generator 40 and, through the intermediary of an output interface 14, to the electric motor 2.

The control device also comprises means for controlling the rotation of the motor 2 and means for regulating the desired angular stopping positions for the drive shaft 5, constituted by switching means MI, DI, RG, SE1, SE2. These switching means are connected, through the intermediary of an input interface 15, to the logic processing unit 12.

A non-volatile memory 16 which can be erased and programmed electrically is connected to a logic processing unit 12, in our example through the intermediary of a memory interface 17. A power supply unit 18 is connected on the one hand to the mains and on the other hand to various constituent members 11 to 17 (terminals Vdd, Vcc, Vss, to which it supplies d.c. voltage.

The control device shown diagrammatically in FIGS. 1,2 and 4 in this example comprises three discs 21, 22 and 23 arranged coaxially side by side around a shaft 24 parallel to the axis of the casing tube 6. The discs 22, 23, which constitute the angular position coder 11, are provided in order to be driven step by step by a fraction of a revolution, in this example by one tenth of a revolution, upon each revolution of the preceding disc, under the action of transfer pinions 22' and 23'. This coder 11 is intended to indicate the angular position of the drive shaft 5 permanently. Each of these discs 22 and 23 supports a printed circuit respectively 19,20, set in rotation by these discs, provided with five concentric conducting tracks, namely one continuous emitting track and four receiving tracks constituted by discontinuous conducting sectors, connected electrically to the emitting track and separated by non-conducting sectors. Fixed to the printed circuit 1, opposite each disc, are five conducting contacts, 22a, 22b, 22c, 22d, 22e for the disc 22 and 23a, 23b, 23c, 23d, 23e for the disc 23, in contact respectively with the five tracks of each of the printed circuits 19 and 20. When a reference voltage is applied to one of the emitting contacts 22a or 23a in contact with the emitting tracks, this reference voltage is picked up on those of the contacts 22b, 22e or 23b to 23e which are in contact with a conducting sector of the receiving tracks. Depending on the length of the conducting sectors and on their angular position on the receiving tracks, angular coding of each disc is produced, in the form of a reference voltage, which is present or absent at the four ends of the contacts 22b to 22e for the disc 22 and 23b to 23e for the disc 23. This code is a four bit digital code (each bit corresponding to the end of a receiving contact) for each disc and in the embodiment the sectors are thus designed to produce ten different codes so that the information present at the ends, connected to the printed circuit 1, of the contacts 22b to 22e and 23b to 23e provides information about the angular position with an accuracy of one tenth of a revolution. For each half-revolution of the drive shaft 5, the disc 22 carried out a rotation of one tenth of a revolution, the disc 23 in turn being rotated by one tenth of a revolution each time the disc 22 carried out a complete revolution. Thus, at the eight ends of the receiving contacts 22b to 22e and 23b to 23e, eight bit digital information is available, which codes the position of the drive shaft 5 with an accuracy of half a revolution and a maximum capacity of fifty revolutions of the drive shaft 5. The ends of the emitting contacts 22a and 23a are connected electrically, through the intermediary of conducting tracks located on the printed circuit 1, respectively to terminals 38a and 38b, the ends of the receiving contacts 22b to 22e and 23b to 23e being connected electrically in pairs to each other (22b to 23b etc. . . ) and connected, through the intermediary of conducting tracks of the printed circuit 1, respectively to terminals 37b to 37e.

The first disc 21 is connected kinematicallly constantly to the drive shaft 5 through the intermediary of toothed pinions whereof the last pinion 25 meshes with the teeth of a toothed ring 26 integral with the drive shaft 5. Moreover, this tubular drive shaft 5 is connected kinematically to the shaft 27 of the motor 2 (FIG. 2) through the intermediary of a driving disc 28. The first disc 21, which comprises slots 29 arranged radially (FIG. 4), forms part of the pulse generator device 40 also comprising a pick-up constituted in our example by an opto-electronic element 30 comprising an emitter 31 and a receiver 32 located opposite slots 29 on either side of the disc 21. During the rotation of the disc 21, the light beam emitted by the emitter 31 is transmitted to the receiver 32 each time a slot is located in the light path, or is interrupted by the disc, which has the result of generating electrical pulses at the output of the receiver 32, the frequency of which depends on the number of slots and speed of rotation of the disc 21. This pulse generator device 40 is intended to supply the logic processing unit 12 with information enabling the latter to calculate the precise angular position of the shaft 5 within half a revolution, in our example, indicated by the angular position coder 11. The emitter device 31 and the output of the receiver 32 are connected electrically to terminals 38c and 37b respectively.

The logic processing unit 12 is constituted in our example by a TMS 1100 microcalculator of TEXAS INSTRUMENTS. The latter comprises input terminals K1, K2, K4 and K8, output terminals R0 to R10 grouped on a first register R and output terminals 02 to 07 grouped on a second register 0.

The terminals 37b, 37c, 37d, 37e and 38a, 38b, 38c are connected respectively to the input terminals K1, K2, K4, K8 and to the output terminals R4, R5, R6 of the logic processing unit 12, through the intermediary of input adaptation elements and output adaptation elements, forming part of the input-output interface 13. Each input adaptation element is constituted for example by a transistor 41 whereof the base is connected, through the intermediary of a resistor 42, to one of the terminals 37 and, through the intermediary of a polarization resistor 43, to the terminal Vdd of the power supply. The collector of the transistor 41 is connected to the input K1 and its emitter to the output R3, in turn connected to the terminal Vss of the power supply by a charging resistor 44. The output adaptation elements are constituted respectively for example by transistors 45, 46, 47 whereof the bases are respectively connected to the output terminals R4, R5 and R6; each collector is connected to the terminal Vdd of the power supply and each emitter is connected to the terminal Vss of the power supply through the intermediary of a charging resistor 48. The emitters of the transistorss 45, 46, 47 are respectively connected also to the terminals 38a, 38b, 38c of the coder.

The outputs R8, R9 of the logic processing unit 12 are connected respectively to two power members forming part of the output interface 14. Each of the latter is constituted by a transistor 49 whereof the base is connected to the terminal R8 or R9 through the intermediary of a resistor 50 and to the terminal Vss of the power supply through the intermediary of a polarization resistor 51. The emitter of each of these transistors is connected to the terminal Vss of the power supply and the collector is connected to the terminal Vdd through the intermediary of the coil 52 of a relay whereof the contact 53 controls the energizing of the electric motor 2, when it closes. The contact 53 controls the motor in a first direction of rotation. The contact 53' controls it in the other direction.

Figure 5:
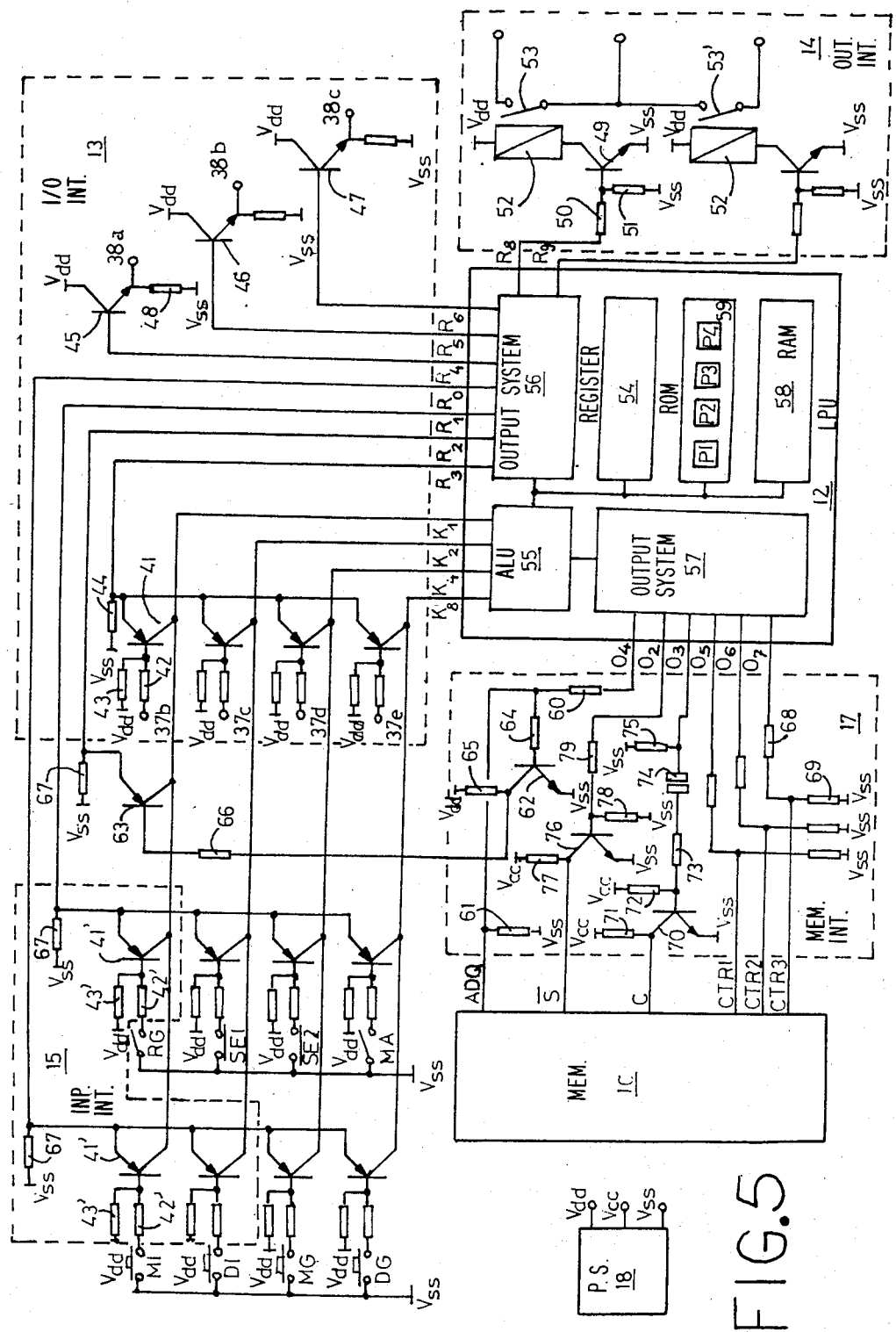
FIG. 5 shows the electrical wiring diagram of the same embodiment.

As illustrated in FIG. 5, the microcalculator 12 comprises an instruction address register 54 connected to a ROM memory 59 in which the sequences of instructions corresponding to the programmes which have to be carried out by this microcalculator 12 are memorized. The ROM memory 59 mainly comprises four separate programmes (FIG. 6): an initialization programme P1, a programme P2 for managing inputs, a programme P3 for controlling the motor and a programme P4 for regulating the stopping positions.

A RAM memory 58, used for storing the data temporarily, is connected to the addressing register 54 and to an arithmetic and logic unit 55 capable of carrying out the operations demanded by the instructions and controlling the linking of the various cycles required by these instructions. The arithmetic and logic unit 55 is also capable of reading the logic levels of the inputs K1, K2, K4 and K8. This RAM in particular contains a zone for memorizing the stopping positions provided.

An output system 56 is connected to the addressing register 54 and to the outputs R0 to R9. This output system 56 is constituted by switching circuits making it possible to position each of the outputs R0 to R9 separately at the logic levels 0 or 1. A second output system 57 is connected to the arithmetic and logic unit 55 and to the outputs 02 to 07. This output system 57 is constituted by the switching circuits making it possible to position all the outputs 02 to 07 at the logic levels 0 or 1 through a programmable logic system.

A non-volatile memory 16 which can be erased and programmed electrically, constituted for example by a MOTOROLA MCM 2801 integrated circuit, is connected on the one hand to the outputs 02 to 07, on the other hand to the input K1 of the microcalculator 12 through the intermediary of the interface 17. Its function is to memorize the angular stopping positions provided, even during prolonged periods when the power supply is cut.

This memory 16, comprising an input-output series, is organised into sixteen words of sixteen bits. A terminal ADQ is used for the series transfer of the address and data. This terminal is connected on the one hand to the output 04 of the microcalculator 12 through the intermediary of a voltage divider constituted by resistors 60 and 61, on the other hand to the input K1 of the microcalculator through the intermediary of two interface transistors 62 and 63, the base of the transistor 62 being connected to the terminal ADQ through the intermediary of a resistor 64. The emitter of this transistor is connected to the terminal Vss of the power supply. Its collector is connected on the one hand to the terminal Vdd through the intermediary of a polarization resistor 65, on the other hand through the intermediary of a resistor 66, to the base of the transistor 63. The emitter of the latter is connected to the output R2 of the microcalculator 12, in turn connected to the terminal Vss through a charging resistor 67. The collector of the transistor 63 is connected to the input K1 of the microcalculator 12.

The terminals CTR1, CTR2, CTR3 of the memory 16 are connected respectively to the terminals 05, 06, 07, through the intermediary of divider bridges forming part of the interface 17, each of the latter being constituted by two resistors 68,69. These terminals are intended for selecting the mode of operation of the memory 16.

The terminal C of the memory 16 is connected to the collector of a transistor 70, in turn connected to the terminal Vcc through the intermediary of a charging resistor 71. The emitter of this transistor is connected to the terminal Vss. Its base is connected on the one hand to the terminal Vcc through the intermediary of a polarization resistor 72 and on the other hand to the terminal 03 through the intermediary of a resistor 73 and a capacitor 74, this terminal 03 being connected to the terminal Vss through the intermediary of a charging resistor 75. The elements 70 to 75, which form part of the interface 17, constitute a clock pulse generator for the memory 16, triggered by the passage of the output 03 from logic level 1 to logic level 0.

The terminal $\bar{S}$ of the memory 16 is connected to the collector of a transistor 76, in turn connected to the terminal Vcc through a resistor 77. The emitter of the transistor 76 is connected to the terminal Vss. Its base is connected on the one hand to the terminal Vss through the intermediary of a polarization resistor 78, on the other hand to the terminal 02 of the microcalculator 12 through the intermediary of a resistor 79. The elements 76 to 79, which form part of the interface 17, constitute a voltage adapter inverter ensuring or not ensuring the operation of the memory 16, depending on the logic level imposed on the output 02 of the microcalculator 12.

The switching means MI and DI provided for controlling the rotation of the motor, respectively in both directions of rotation, are constituted by pushbuttons whereof one of the terminals is connected to the terminal Vss of the power supply and whereof the other terminal is connected to one of the input terminals, respectively K1, K2 of the microcalculator 12, through the intermediary of an interface element forming part of the input interface 15. This interface element comprises components 41', 42' and 43', respectively similar to the components 41, 42 and 43.

A function switch RG, constituted for example by a switch having two fixed positions, has one of its terminals connected to the terminal Vss of the power supply and its other terminal connected to the input K1 through the intermediary of an interface element 41'-42'-43'. This switch is intended to allow the transformation of the switching means MI DI into means for regulating the angular stopping positions of the drive shaft 5.

Without it being necessary to add additional constituent elements, the control device which is the object of the invention may be arranged to fulfil additional functions: namely ensuring safety in the case where the movable member encounters an obstacle, allowing simultaneous control of several motors. To this end, additional switching means SE1, SE2 are respectively connected to the inputs K2, K4 through the intermediary of an interface element 41'-42'-43'. The switching means SE1, SE2 are for example contacts provided in a feeler bar located at the front of the movable member. The contact SE1 is provided solely for stopping the motor when the feeler bar encounters an obstacle. The contact SE2 is provided for reversing the direction of movement of the movable member, in the same situation.

Other additional switching means MG, DG and MA are connected respectively to the inputs K4, K8 and K8 through the intermediary of an interface element 41'-42'-43'. The first two are intended to control several motors through the intermediary of several control devices similar to that described in the present invention. Depending on its position, the switching means MA (M=manual, A=automatic), gives different priorities to the switching means MG, DG on the switching means MI, DI. A control device of this type is described in French Patent Application No. 81 14 623 of the same applicant. The additional functions may thus be ensured at the same time as the functions controlling the rotation of the motor and stopping of the latter, by a single microcalculator whereof the programmes contained in the ROM memory 59 are provided for managing all these functions. This is also an additional advantage of the present invention, since these additional functions are obtained without necessitating an additional (general - individual) control device, without the bulk of the control device incorporated in each motor being increased.

Figure 6:
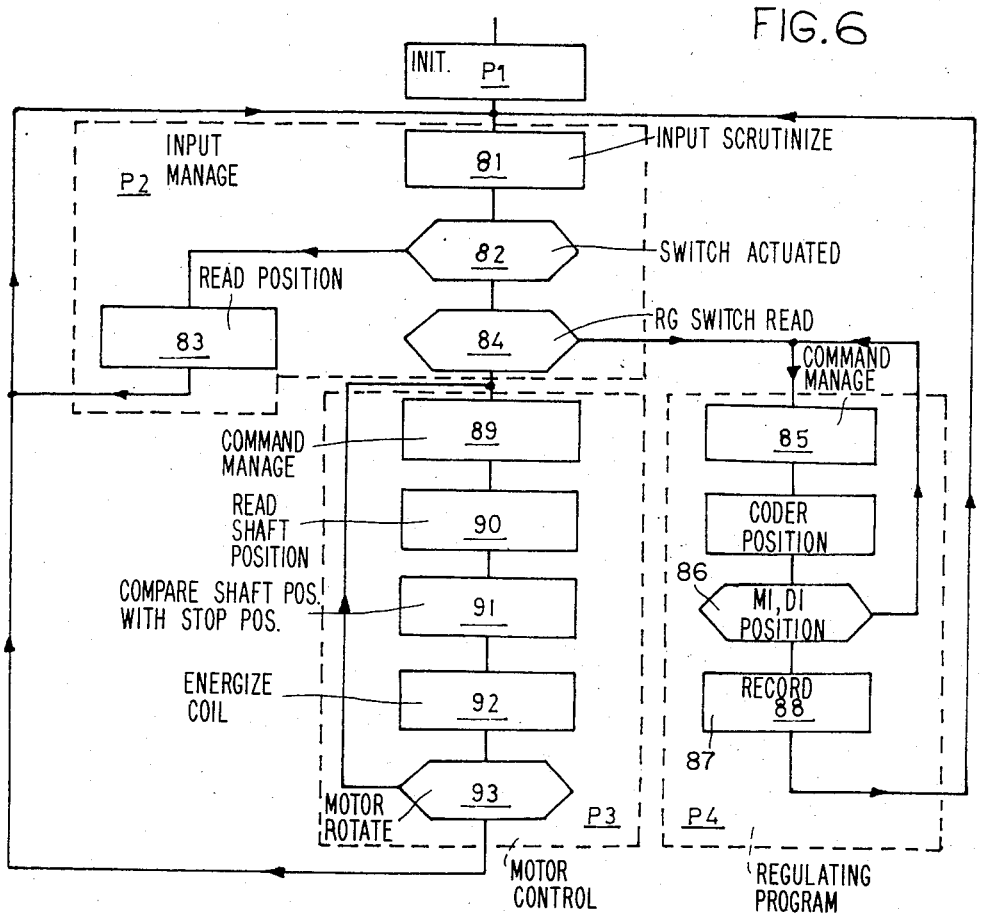
FIG. 6 is a diagram of the programmes contained in the ROM memory of the microcalculator constituting the logic processing unit.

The programmes P1 to P4 stored in the ROM memory 59 are shown in FIG. 6. The initialization programme P1 comprises instructions whereof the last precedes the first instruction of sub-programme 81 for scrutinizing the inputs, forming part of the programme P2 for managing the inputs. The last instruction of sub-programme 81 precedes the first instruction of sub-programme 82 which ascertains the fact that at least one switching means MI, DI, MG, DG, MA, SE1, SE2, RG has been actuated. The last instruction of sub-programme 82 is a conditional call instruction to the address of the first instruction of sub-programme 83 for reading the position given by the coder 11, or to the address of the first instruction of sub-programme 84 which ascertains the position of the function switch RG. The last instruction of sub-programme 83 is an unconditional call instruction to the first instruction of sub-programme 81 for scrutinizing the inputs.

The last instruction of sub-programme 84 in a conditional call instruction to the address of the first instruction of sub-programme 85 for managing the commands received, forming part of the regulating programme P4, or to the address of the first instruction of sub-programme 89 for managing the commands received, forming part of the programme P3 for controlling the motor.

The last instruction of sub-programme 85 precedes the first instruction of sub-programme 86 for reading the position given by the coder 11 and by the pulse generator 40. The last instruction of sub-programme 86 precedes the first instruction of sub-programme 87 for ascertaining the position of the switches MI, DI. The last instruction of sub-programme 87 is a conditional call instruction to the address of the first instruction of sub-programme 85, or to the address of the first instruction of sub-programme 88 for recording and safeguarding the regulating positions. The last instruction of sub-programme 88 is an unconditional call instruction to the address of the first instruction of sub-programme 81.

The last instruction of sub-programme 89 for managing the commands received precedes the first instruction of sub-programme 90 for reading the position given by the coder. The last instruction of subprogramme 90 precedes the first instruction of subprogramme 91 for comparing the position given by the coder with the stop positions recorded. The last instruction of sub-programme 91 precedes the first instruction of sub-programme 92 for carrying out the commands received. The last instruction of subprogramme 92 precedes the first instruction of subprogramme 93 for ascertaining stoppage of the motor. The last instruction of sub-programme 93 is a conditional call instruction to the address of the first instruction of sub-programme 89, or to the address of the first instruction of sub-programme 81.

When the control device is energized or each time it is re-energized, the microcalculator 12 carries out the initialization programme P1, the function of which is to transfer at this instant the data present in the non-volatile memory 16 to the RAM memory 58.

In the inoperative position, the microcalculator 12 sends sequential pulses to the scrutinizing outputs RO - R1, through the intermediary of the scrutinizing programme 81. At the same time that it sends pulses, the microcalculator 12 receives on the one hand at the input terminal K1 information relating to the positions of two switches MI, RG, on the other hand at the input terminals K2, K4, K8, information relating to the positions of switches respectively DI and SE1, MG and SE2, DG and MA through the intermediary of the input interface 15. Since no switching means is actuated, sub-programme 83 for reading the position given by the coder 11 and by the pulse generator 40 is carried out, sequential pulses being sent to the outputs R4, R5, R6 by keeping the output R3 at logic level 1, whereas information relating to the angular position indicated by the coder 11 and by the pulse generator 40 is collected at the inputs K1, K2, K4 and K8 and transferred to the RAM 58 of the microcalculator 12.

In order to effect the regulation of a first extreme stopping position of the movable member, the operator closes the switch RG and the switch MI. The closure of these switches is read by the microcalculator at the input K1 by the scrutinizing programme 81. Subprogramme 82 ascertains that the switch MI is actuated and sub-programme 84 ascertains that the switch RG is in the closed position. Sub-programme 85 for managing the commands received puts the output R8 to logic level 1, which has the effect of supplying power to the coil 52 and closing the contact 53, supplying power to the motor in a first direction of rotation and the movement of the movable member towards its first extreme stopping position. The coder 11 and the pulse generator 40 are driven at the same time by the drive shaft 5. As long as the switch MI is kept closed, the programme 86 reads the angular position given by the coder 11 and by the pulse generator 40, the programme 87 ascertains that the switch MI is closed and returns the programme to the address of the first instruction of sub-programme 85. In order to reach the first extreme position in a precise manner, the operator may use the switches MI and DI in succession in order to move the movable member in one direction or the other.

When the first extreme position of the movable member is reached, the operator releases the switch. The programme 85 sets the output R8 at logic level 0, which has the effect of interrupting the power supply to the coil 52 and the motor 2 stops. The programme 87 ascertains that the switches MI and DI are released and returns the programme to the address of the first instruction of sub-programme 85.

At this instant, the operator presses simultaneously on the push-buttons MI and DI, which corresponds to a stop operation, then he preses on the switch MI, corresponding to the first extreme stopping position to be regulated. The simultaneous closure of MI and DI is detected at the input terminals K1, K2, which diverts sub-programme 87 to the first instruction of subprogramme 88 for recording and safeguarding stopping positions. The closure of the switch MI indicates to the sub-programme 88 that the stopping position to be recorded corresponds to the first position. The subprogramme is implemented. The position given by the coder is transferred to a register of the RAM memory 58 then, through the intermediary of an arithmetic and logic unit 55 and of the output register 57, to the memory 16 in which it is memorized. This memory 16 is a non-volatile memory which can be erased and programmed electrically, so that the data which are memorized therein are preserved even if there is a prolonged interruption of the power supply.

In the same way, the second extreme position is regulated by closing the switch RG, then by acting on DI in order to bring the movable member into this second position. This position is memorized by closing the switches MI, DI together, then by acting on DI.

In the same way, the movable member is able to be stopped automatically in any intermediate positions. In order to regulate one of these stopping positions, the movable member is brought into this stopping position, then one acts simultaneously on MI and DI twice in succession, which causes the recording of the position given by the coder 11 and by the pulse generator 40 in a register of the RAM memory 58 and its transfer to the non-volatile memory 16. These operations are effected by sub-programme 88, as previously.

When the regulating operations are terminated, the operator opens the function switch RG. The movable member is then ready to be controlled.

When the operator closes the switch MI for example briefly once, without actuating the switch DI at the same time, the scrutinizing sub-programme 81 detects that this switch MI is closed, sub-programme 82 ascertains that at least one control switch has been actuated, subprogramme 84 ascertains that the switch RG is in the open position, which diverts the programme to the first instruction of sub-programme 89 for managing the commands received. Sub-programme 89 indicates that the switch MI has been actuated only once, which corresponds to a command to move the movable member into its first extreme position without stopping in any of the intermediate positions recorded. Sub-programme 90 then reads the angular position of the drive shaft 5, given by the coder 11 and by the pulse generator 40, sub-programme 91 compares the position read with the first extreme stopping position recorded. If these positions are different, sub-programme 92 for carrying out the commands received supplies power to the coil 52 which controls the closure of the contact 53. The motor rotates in its first direction of rotation as well as the drive shaft, the coder 11 and the pulse generator 40.

Programme 93 ascertains that the motor is rotating, which returns the programme to the address of the first instruction of sub-programme 89. When the position read on the coder 11 and on the pulse generator 40 coincides with the first extreme stopping position recorded, the programme 92 for carrying out the commands received, interrupts the supply of power to the coil 52; the motor 2 stops, the programme 93 ascertains that the motor is stopped, which returns the programme to the first instruction of sub-programme 81 for scrutinizing the inputs.

During the movement of the movable member towards its first extreme position, an obstacle may be presented in front of the feeler bar and close one of the contacts SE1 or SE2. The closure of the contact SE1, read on the input K2 of the microcalculator, causes the emission by the sub-programme 89 for managing the commands received, of an unconditional stop command carried out by subprogramme 92 which cuts the supply of power to the motor. The closure of the contact SE2, read at the input K4 of the microcalculator causes the emission by the subprogramme 81 for managing the commands received, of an unconditional command for changing direction of the motor and for its operation in the reverse direction as far as the second extreme stopping position.

Starting from the first extreme stopping position, for example, it is possible to control the movement of the movable member with a stoppage in a pre-regulated intermediate position. In order to do this, one actuates the switch DI controlling the movement towards the second extreme position by closing it twice in succession briefly, which involves the reading at the input K2 of the microcalculator 12, of two brief pulses. Sub-programme 89 for managing the commands received generates a command requesting movement with stoppage in an intermediate position, carried out by the sub-programme 92 after reading the position given by the coder 11 and by the pulse generator 40 and comparison with the preregulated positions, which brings about rotation of the motor in the second direction of rotation through the intermediary of the relay 52-53'. When sub-programme 91 for comparing the position read with the pre-regulated intermediate stopping position, ascertains that the two positions are identical, sub-programme 92 carries out a command to stop the motor, which is ascertained by subprogramme 93. The programme is then sent to the first instruction of the scrutinizing sub-programme 81.

If the power supply 18 is cut, all the circuits of the control device are disconnected. During the power cut, the non-volatile memory 16 keeps the angular stopping positions provided memorized, even if the power cut is very long (for example several years).

It is possible to actuate an auxiliary manual control in order to rotate the drive shaft 5. The coder 11 and pulse generator 40 follow the angular position of this shaft.

At the time of reactivation, the power supply 18 supplies the voltage necessary for the operation of the entire device. The microcalculator 12 is initialized automatically at the address of the first instruction of the initialization programme P1. During the implementation of this programme, the data contained in the non-volatile memory 16 are transferred to the RAM memory 58 through the intermediary of members 62,64,65 of the interface 17. In a parallel manner, the coder 11 and the pulse generator 40 indicate the angular position of the drive shaft 5, even if the latter has been changed during the power cut. The device then operates under the same conditions as before the power cut, without it being necessary to regulate the stopping positions again.

The movement of the movable member to any of its pre-regulated positions may be controlled in the same manner as by the switches MI, DI, by the switches MG, DG which at the same time control several control devices according to the present invention, according to an order of priority dependent on the position of the switch MA belonging to each control device. As described in Patent Application No. 81 14 623, if this switch occupies the open position (automatic), the commands coming from the switches MG, DG, take priority over the commands coming from the switches MI, DI and everything takes place as if one had actuated one of the switches MI or DI. If this switch MA occupies the closed position (manual), priority is given to the commands coming from the switches MG, DG, solely during the period of time when the latter are kept in the closed position.

According to a second embodiment, not shown in the drawings, the angular position coder 11 is dispensed with and only a pulse generator remains, which is for example similar to the generator 40 of the first embodiment (FIGS. 1 to 6). In this solution, the coder interface 13 comprises a single interface element 41-42-43 connected between K1 and the output of the receiver 32. The non-volatile memory 16 as well as its interface 17 are dispensed with and replaced by a battery connected to the terminal Vdd of the power supply. All the other constituent elements are identical.

The programmes P1, P2, P3, P4 of the first embodiment remain unchanged with the exception of subprogrammes 83, 90 and 86 for reading the position given by the pulse generator 40, which are replaced by subprogrammes for calculating the position of the drive shaft by counting or deducting the pulses provided by the generator 40.

The operation of this embodiment is similar to that of the first embodiment described (FIGS. 1 to 6). The battery maintains a power supply to all the circuits if the mains power supply is cut. It is recharged automatically when the mains power supply is present. Owing to this, the information stored in the RAM memory 58 is preserved without the necessity of using an additional non-volatile memory. A device of this type only allows power cuts which are not unlimited (for example several months).

What is claimed is:

1. A device for controlling an electric motor adapted for rotating a drive shaft of a movable member, the device comprising:

a hybrid encoder, including means for generating a pulse output signal in response to the rotation of the drive shaft, and a shaft position encoder;

the pulse signal generating means including a rotatable apertured disc operatively linked to the drive shaft to rotate therewith, the apertured disc including a plurality of apertures arranged circumferentially thereabout, the apertures being formed through the thickness of the disc, the apertured disc having opposite flat sides; and an optoelectronic emitter and receiver arranged on opposite flat sides of the apertured disc and in alignment with the apertures, the emitter being adapted to emit a light beam through the apertures and the receiver being adapted to receive the light beam, the apertured disc being interposed between the emitter and the receiver to periodically interrupt the light beam upon rotation of the apertured disc, the shaft position encoder including at least two rotatable encoder discs arranged coaxially with the apertured disc, the apertured disc and each of the at least two encoder discs being mechanically linked to proportionally rotate at different speeds so that a complete revolution of the apertured disc will result in a partial revolution of one of the at least two encoder discs, and a complete revolution of said one of the at least two encoder discs will result in a partial revolution of the other of the at least two encoder discs;

each of the at least two encoder discs including at least one electrically conductive continuous emitting track mounted thereon and at least one electrically conductive discontinuous receiving track mounted thereon; and electrically conductive contacts positioned adjacent to and in contact with each of the emitting and receiving tracks of each encoder disc, the shaft encoder providing an output signal representative of the angular position of the drive shaft;

means for regulating a desired angular stopping position, the stopping position regulating means including switching means, the switching means providing an output signal;

means for controlling the rotation of the motor, the motor controlling means including switching means, the switching means of the motor controlling means providing an output signal;

a logic processing unit responsive to the output signals of the pulse signal generating means and the shaft encoder of the hybrid encoder and to the output signals of the switching means of the regulating means and the motor controlling means, the logic processing unit providing a control signal to the electric motor, the logic processing unit including a working memory for storing a desired angular stopping position, the logic processing unit being provided for analyzing the output signal of the pulse signal generating means, for calculating the angular position of the drive shaft, for comparing the angular position of the drive shaft with the desired stopping position, and for interrupting the rotation of the motor when the angular position of the drive shaft is equal to the desired stopping position; and an erasable and non-volatile memory for protectively storing the desired angular stopping position in the event of a power failure, the non-volatile memory being connected to the logic processing unit.

2. A control device as claimed in claim 1, further comprising a function switch connected to the logic processing unit to make it possible to transform the switching means of the motor controlling means into means for regulating the desired angular stopping position of the drive shaft.

* * * * *